(12) United States Patent
Choi et al.

(10) Patent No.: US 8,610,709 B2
(45) Date of Patent: Dec. 17, 2013

(54) METHOD AND APPARATUS FOR WATERMARKING OF 3D MESH MODEL

(75) Inventors: Jong-Uk Choi, Seoul (KR); Jizhe Cui, Yanji (CN); Jong-Weon Kim, Seoul (KR)

(73) Assignee: Markany Inc., Seoul (KR)

( * ) Notice: Subject to any disclaimer, the term of this patent is extended or adjusted under 35 U.S.C. 154(b) by 566 days.

(21) Appl. No.: 12/919,476

(22) PCT Filed: Feb. 25, 2009

(86) PCT No.: PCT/KR2009/000906
§ 371 (c)(1),
(2), (4) Date: Dec. 1, 2010

(87) PCT Pub. No.: WO2009/107982
PCT Pub. Date: Sep. 3, 2009

(65) Prior Publication Data
US 2011/0286624 A1    Nov. 24, 2011

(30) Foreign Application Priority Data
Feb. 25, 2008  (KR) ........................ 10-2008-0016919

(51) Int. Cl.
G06T 15/00 (2011.01)
G06T 17/00 (2006.01)
G06K 9/00 (2006.01)

(52) U.S. Cl.
USPC ........................... 345/419; 345/420; 382/100

(58) Field of Classification Search
None
See application file for complete search history.

(56) References Cited

FOREIGN PATENT DOCUMENTS

| KR | 2003-0045370 A | 6/2003 |
| KR | 2003-0093825 A | 12/2003 |
| KR | 2004-0002250 A | 1/2004 |
| KR | 2004-0003185 A | 1/2004 |

OTHER PUBLICATIONS

Harte et al (Watermarking 3D models, 2002).*
Cheng et al ("A high capacity steganographic approach for 3D polygonal meshes", 2006).*
International Search Report for PCT/KR2009/000906 dated Aug. 14, 2009.
Ryutarou Ohbuchi, et al., "Watermarking Three-Dimensional Polygonal Models," Proceedings of the ACM Multimedia 97', Seattle, Washington, U.S.A. Nov. 1997, pp. 261-272.

(Continued)

*Primary Examiner* — David Zarka
*Assistant Examiner* — Avinash J Yentrapati
(74) *Attorney, Agent, or Firm* — Nixon Peabody LLP; Joseph Bach, Esq.

(57) ABSTRACT

Provided are a watermarking method and a watermarking apparatus for a mesh mode, which are applicable to a system which requires high precision, such as a rapid prototyping system. A reference coordinate system is set using 1-ring values of vertices of a 3D mesh model. The vertices are sorted based on the set reference coordinate system, and bit-information of the watermark consisting of bit string is, respectively, embedded into each of polygonal faces of the 3D mesh model in the sorted order.

The present invention is advantageous in that the shape of the model is not deformed even when watermarked, and therefore the present invention is useful in a rapid prototyping system which requires high precision for the purpose of authenticating data integrity. The present invention can be also used for the purpose of marking contents without the need for storing, and for the purpose of information hiding.

24 Claims, 7 Drawing Sheets

(56) References Cited

OTHER PUBLICATIONS

Chang-Min Chou, et al., "Technologies for 3D Model Watermarking: A Survey," International Journal of Computer Science and Network Security, vol. 7, No. 2, Feb. 2007.

Oliver Benedens, "Two High Capacity Methods for Embedding Public Watermarks into 3D Polygonal Models" Proceedings of the Multimedia and Security-Worshop at ACM Multimedia 99, Orlando, Florida, 1999. pp. 95-99.

Oliver Benedens, "Watermarking of 3D Polygon Based Models with Robustness against Mesh Simplification." Proceedings of SPIE: Security and Watermarking of Multimedia Contents, 1999. vol. 3657, pp. 329-340.

Stephen Toub, et al., "Efficient Mesh Licensing," Computer Science 276r, Harvard University, May 2001.

Emil Praun, et al., "Robust Mesh Watermarking," ACM SIGGRAPH Proceedings, 1999, pp. 69-76.

Min-Su Kim, et el., "A Blind Watermarking for 3-D Mesh Sequence Using Temporal Wavelet Transform of Vertex Norms" vol. 32, No. 3, Mar. 2007, pp. 256-268.

Ryutarou Ohbuchi, et al., "Watermarking 3D Polygonal Meshes Using Mesh Spectral Analysis," Transactions of Information Processing Society of Japan, vol. 42, No. 5, pp. 1103-1114, 2001.

\* cited by examiner

BEFORE EMBEDDING    AFTER EMBEDDING (a)  (b)

(c)

VENUS　　BUNNY　　HUMAN　　EPCOT

VENUS　　BUNNY　　HUMAN　　EPCOT

MOVE    ROTATE    DOWNSCALE    MOVE+ROTATE+DOWNSCALE (a)    (b)

METHOD AND APPARATUS FOR WATERMARKING OF 3D MESH MODEL

RELATED APPLICATIONS

This application is a National Phase of International Application No. PCT/KR2009/000906, entitled "WATERMARKING METHOD FOR THREE-DIMENSIONAL MESH MODEL AND APPARATUS THEREOF", which was filed on Feb. 25, 2009, and which claims priority of Korean Patent Application No. 10-2008-0016919, filed on Feb. 25, 2008.

The present invention relates to a method and apparatus for watermarking of a 3-dimensional (3D) mesh model, and more particularly, to a method and apparatus for digital watermarking for authenticating integrity of a 3D mesh model that is used in a rapid prototyping system.

BACKGROUND

Recently, as a technique resulting from combination of techniques in various fields, such as image processing, electronic control, polymer materials, and optics, a Rapid Prototyping System called 3-dimentional printer technique has been widely used. The rapid prototyping system is a system for manufacturing a physical model by laminating rapid solidification materials such as phenolic resin with uniform thickness. The system is advantageous in that time for developing new products can be reduced, that it is possible to model products in complicate and geometrical shapes, and that a designer can directly assemble or interpret an actual model.

A 3-dimensional (3D) mesh model is applied at CAD modeling of such rapid prototyping system, and is represented by a group of surrounding polygonal faces, and includes a list of three tables, i.e., a vertex table represented by rectangular coordinate values of a point, an edge table represented by coordinate values of vertices or their indices, and a polygonal face table represented by edges or indices of vertices. A file format widely used for a 3D mesh model is STL (Stereo Lithography). The STL file format can be obtained by converting external file formats such as PLY (Polygon File Format or Standard Triangle Format), DAE (Collada File Format), OBJ (Alias Wavefront Object), and OFF (Object File Format). Unlike PLY, DAE, OBJ and OFF files, the STL file format includes normal vector information for indicating the direction of a face in consideration of a rapid prototyping system, in addition to information represented by the list of three tables.

Meanwhile, considering the characteristics of the rapid prototyping industry where various fields are combined, the need for integrity guarantee and authentication of a 3D mesh model that is given and taken as a final product of joint corporation has been continuously increased. In the actual manufacturing process, in order to reduce errors of data and increase precision, software for identifying, verifying and modifying manufactured 3D data have been used. As techniques widely used to satisfy the need for integrity guarantee and authentication of data, there are a cryptographic technique and a watermarking technique. However, considering the characteristics of the rapid prototyping industry, a process of applying a 3D mesh model to meet the use of a trial product after demodulating is required, and thus the use of cryptographic technique is extremely limited.

In contrast, the watermarking technique for preventing illegal copying and protecting a copyright of a copyright holder by embedding user information (watermark) into data to hide from a user can solve the problem of the cryptographic technique because the technique directly embeds information into a model. Thus, the watermarking technique can be used for authenticating integrity of a 3D mesh model. It is possible for the watermarking technique to embed a watermark into a 3D mesh model by using information such as the coordinate values of a vertex, the length of an edge, the area or likelihood of a polygon, the ratio of an area, the color of an area or a vertex, and the normal vector of a vertex.

Hereinafter, researches for watermarking of a 3D mesh model that have been variously developed along with the image and video fields will be explained.

First, Ohbuchi proposed TSQ and TVR algorithms, together with the concept of three-dimensional model watermarking (R. Ohbuchi, H. Masuda, and M. Aono, "Watermarking Three Dimensional Polygonal Models," Proceedings of the ACM Multimedia 97', Seattle, Wash., U.S.A. November 1997, pp. 261-272). TSQ algorithm is an algorithm for embedding a watermark using the ratio of the lengths of two sides of a triangle and the ratio between the height of a triangle and its base, wherein the watermark is embedded by modifying and changing the positions of vertices so as to have particular ratios. TVR algorithm is an algorithm using the ratio of the volume of a tetrahedron to express a watermark by modifying the ratio of the volume of the tetrahedron by changing the coordinates of a particular vertex.

In a similar way, Chang et al. embedded a watermark by changing the ratio of the length of an edge with four triangles as the basic factor (Chang min Chou, and Din Chang Tseng. "Technologies for 3D Model Watermarking: A Survey," International Journal of Computer Science and Network Security, Vol. 7 No. 2 Feb. 2007).

Benedens proposed two watermarking algorithms, i.e., VFA and TFA, where large-capacity information can be embedded (O. Benedens "Two High Capacity Methods for Embedding Public Watermarks into 3D Polygonal Models" Proceedings of the Multimedia and Security-Worshop at ACM Multimedia 99, Orlando. Fla., 1999. pp. 95~99). In VFA algorithm, a watermark is embedded by designating one triangle, and then dividing vertices into several groups according to their distances to the mass center of the designated triangle, and modifying the coordinates of the vertices within the groups. In TFA algorithm, a watermark is embedded by designating one triangle, finding all triangles that share an edge with the designated triangle, sorting the distances from the vertices that does not share the edge to an edge of the shared triangle according to the distances, and modifying the value of the height of each triangle.

Benedens also proposed an algorithm for embedding a watermark using a normal vector (O. Benedens, "Watermarking of 3D Polygon Based Models with Robustness against Mesh Simplification." Proceedings of SPIE: Security and Watermarking of Multimedia Contents, 1999. Vol. 3657, pp. 329~340), and this is an algorithm that requires an original work, wherein a watermark is embedded by changing the distribution of the normal vector of a triangle mesh.

In addition, there is an algorithm proposed by Toub (S. Toub, A. Healy, "Efficient Mesh Licensing," Computer Science 276r, Harvard University, May 2001). In this algorithm, two models A and B are obtained by moving vertices of an original model into an opposite direction under the condition where phase information is not changed, then in case of embedding bit-information 1 based on watermark information to be embedded, coordinate values of model A were used, and in case of embedding bit-information 0, coordinate values of model B were used. The Toub's algorithm maintains constant robustness against attacks by movement, rotation, scaling, cropping, and re-sorting of vertices, but is disadvantageous in that in the process of extracting a watermark, the algorithm requires information on the models A and B that were used for embedding and an original model.

Praun et al. introduced a watermark algorithm relatively robust against typical attacks (E. Praun, H. Hoppe and A. Finkelstein, "Robust Mesh Watermarking," SIGGRAPH Proceeding, 1999, pp. 69~76). Praun's algorithm made a scalar-based function by inputting the coordinates of vertices of a mesh model, and set the strength of embedding by using it to change the coordinates of the vertices.

However, lots of conventional researches on watermarking algorithms of a 3D model have been performed based on a method of embedding noise which cannot be visually verified, and they show that after a watermark is embedded, precision of an original model is substantially decreased and the shape of the model itself is deformed. And, almost all of the researches have focused on robustness of a watermark, and researches on preservation of precision of a model itself have been insignificant. This means that in the rapid prototyping system or aerospace model manufacturing field that require high precision, conventional algorithms cannot be used. To be specific, the rapid prototyping system, for example, refers to a system for manufacturing a trial product by cutting materials using a cutting tool such as laser or knife and laminating the materials. The main feature of the rapid prototyping system lies in maintaining high precision; however, according to conventional watermarking algorithms, there is no error or improper factor in design, and a watermark itself would be an improper factor in the rapid prototyping system.

Accordingly, the above-mentioned conventional algorithms can be used for protecting copyrights in the animation, simulation and game fields, but since the conventional watermarking algorithms lead to distort a 3-dimentional shape, thereby decreasing precision, in an applicable field such as rapid prototyping that requires high precision, the shape of a trial product is distorted, and thus these algorithms cannot be used in manufacturing places.

DETAILED DESCRIPTION

Problems to be Solved

To solve the conventional problems, an object of the present invention is to provide a method and apparatus for watermarking, wherein a watermark can be embedded without deforming the shape of a 3-dimensional mesh model such that the watermark-embedded model and the original model have the same precision, and wherein this can be effectively used for authenticating the integrity or hiding information in the manufacturing fields, with high precision where a rapid prototyping system and aero and nano techniques are used.

Technical Means for Solving the Problems

In order to achieve the above objects, the present invention provides a method for embedding a watermark for a 3-dimensiona (3D) mesh model, comprising: setting a reference coordinate system using 1-ring values of vertices of the 3D mesh model; a first sorting for sorting the vertices in a predetermined order based on the reference coordinate system; embedding bit-information of the watermark by changing the order of index values of the vertices of polygonal face of the 3D mesh model according to the order of the vertices sorted at the first sorting, wherein the bit-information consists of bit string; and a second sorting for re-sorting the vertices sorted at the first sorting in the original order.

In addition, the present invention provides a method for extracting a watermark from the 3-dimensional (3D) mesh model, comprising: setting a reference coordinate system using 1-ring values of vertices of the 3D mesh model; a first sorting for sorting the vertices in a predetermined order based on the reference coordinate system; and determining bit-information of the watermark based on the order of index values of the vertices of polygonal face of the 3D mesh model in the order of vertices sorted at the first sorting, wherein the bit-information consists of bit string.

Effects of the Invention

According to the present invention, it is possible to satisfy the need of a rapid prototyping system for high precision. In other words, since typical watermarking methods decrease the precision of a rapid prototyping system, there is a limitation in their applications. However, the present invention does not deform the shape of a model before and after embedding information, and thus the present invention can be variously applied in the mechanical, automobile, aerospace and shipbuilding fields that require trial products with high precision. In addition, the present invention is robust against conversion while preserving its shape such as moving, rotating, downscaling, converting file formats, changing the order of storing vertices, and is weak against typical attacks such as changing the shape, and thus the present invention can be used for authenticating the integrity of data. In the game and animation fields, integrity of data can be authenticated by using the present invention twice. Other than these effects, the present invention can be used for hiding information because lots of information can be embedded.

BEST MODES FOR CARRYING OUT THE INVENTION

Hereinafter, preferred embodiments of the present invention will be described with reference to the drawings.

Figure 1:
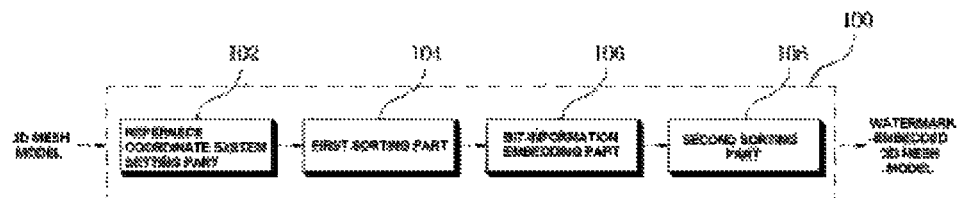
FIG. 1. is a block diagram illustrating the constitution of an apparatus for embedding a watermark according to the present invention.

FIG. 1 is a block diagram illustrating the constitution of an apparatus (100) for embedding a watermark according to the present invention. The apparatus (100) for embedding a watermark comprises a reference coordinate system setting part (102) for setting a reference coordinate system that is the reference for embedding a watermark, a first sorting part (104) for sorting vertices of a 3D mesh model, a bit-information embedding part (106) for embedding bit-information of the watermark into the 3D mesh model, and a second sorting part (108) for re-sorting the vertices of the 3D mesh model in the order stored in a vertex table before inputting the bit-information.

A 3D mesh model is applied at CAD modeling of a rapid prototyping system. The 3D mesh model comprises data consisting of three tables, i.e., a vertex table represented by the rectangular coordinate values of a point, an edge table, and a face table represented by the indices of vertices.

When a 3D mesh model is input to the apparatus (100), the reference coordinate system setting part (102) sets a reference coordinate system that is the reference for sorting vertices, and a first sorting part (104) sorts the vertices based on the distance from the center point of the reference coordinate system set at the coordinate system setting part (102) to each vertex of the 3D mesh model. The bit-information embedding part (106) embeds bit-information of the watermark for each of polygons of the 3D mesh model in the order of the sorted vertices. When embedding is completed at the bit-information embedding part (106), the second sorting part (108) re-sorts the vertices in the order stored in the vertex table of the 3D mesh model before the bit-information is input in the apparatus (100) with reference to the order of triangular faces. Finally, at the output member of the apparatus (100), a watermark-embedded 3D mesh model can be obtained.

Figure 2:
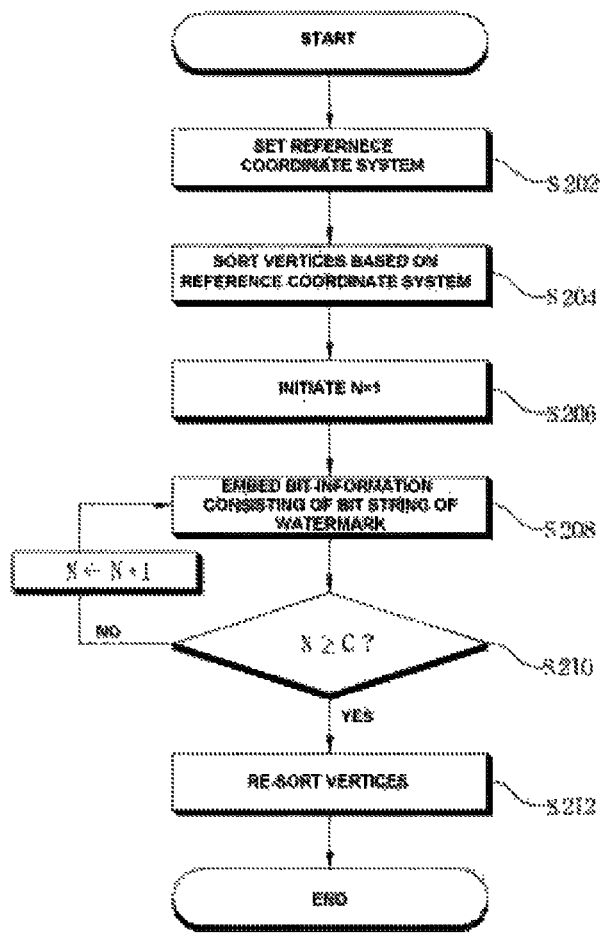
FIG. 2 is a flow chart illustrating a process of embedding a watermark according to the present invention.

FIG. 2 is a flow chart illustrating a method of embedding a watermark using the apparatus (100). The constitution of the apparatus (100) illustrated in FIG. 1 will be described in more detail with reference to FIG. 2.

When a 3D mesh model to be embedded watermark is input in the apparatus (100), the reference coordinate system setting part (102) sets a reference coordinate system using data of the input 3D mesh model (S202).

For center points generally used for a 3D mesh model, there are a mesh center based on the center point of a bounding box, and the origin (0, 0, 0) of all vertices of a 3D mesh model. The coordinate value of the mesh center is the mean of a minimum value and maximum value corresponding to each coordinate axis among the coordinate values of vertices as below. $((x_{min}+x_{max})/2, (y_{min}+y_{max})/2, (z_{min}+z_{max})/2)$ However, if the conversion by rotation is executed, the shape of the bounding box is deformed, so that the mesh center is also changed. In addition, if the conversion by moving, rotating and downscaling is executed with respect to the origin, the relative position of the origin to the 3D mesh model is changed. To be specific, since the mesh center or the origin depends on the coordinate values of vertices, they can be easily changed by the geometric conversion, and thus the mesh center or origin cannot be used as the center point that would be the reference for embedding a watermark. Accordingly, for a robust watermark against the geometric conversion, there is a need to set a new reference coordinate system by the reference coordinate system setting part (102).

Figure 3:
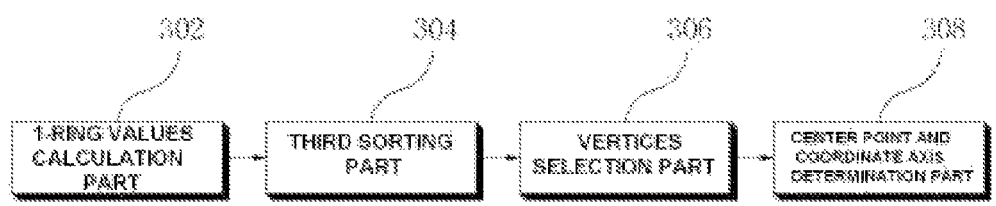
FIG. 3 is a block diagram illustrating the constitution of a reference coordinate system setting part according to the present invention.

FIG. 3 is a block diagram illustrating the constitution of a reference coordinate system setting part (102). The reference coordinate system setting part (102) comprises a 1-ring value calculation part (302) for calculating 1-ring values of vertices, a third sorting part (304) for sorting the vertices according to the 1-ring values, a vertex selection part (306) for selecting three vertices among the sorted vertices, and a center point and coordinate axis determination part (308) for determining the center point, and the coordinate axis, of the reference coordinate system using the selected three vertices.

Figure 4:
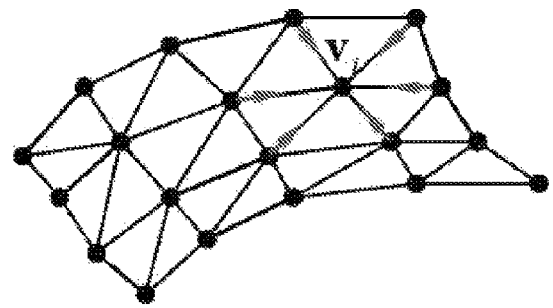
FIG. 4 illustrates 1-ring of vertices of a 3D mesh model.

The 1-ring calculation part (302) calculates the 1-ring values of all vertices using the vertex table and face table of a 3D mesh model. The 1-ring refers to the number of vertices directly connected to one vertex of a mesh model, and the size of the 1-ring group is called 1-ring value. For example, as in FIG. 4, the number of vertices adjacent to vertex $V_i$ totals 6, and thus the number of 1-rings of vertex $V_i$ is 6 and the 1-ring value is 6.

In embedding a watermark, if normal vector information that is contained in a 3D mesh model is used, there would be a problem that when converting a file, bit-information of the embedded watermark would disappear because PLY file format, etc. except for STL file format does not use normal vector information. Color information also disappears when converting file format, and thus there is the same problem. However, 1-ring values are information that can be obtained from a table constituting the coordinate values of vertices and polygonal faces (for example, in case of using STL file format, triangular faces), and thus even if a file format is converted, such problem does not occur.

And then, the third sorting part (304) sorts the vertices in descending order according to the 1-ring values.

In this embodiment, the vertices are sorted in descending order to set a reference coordinate system, but it is not necessarily limited to this, and the vertices can be sorted in ascending order or other possible predetermined order. If there are vertices having the same 1-ring value, the vertices are sorted using 2-ring values of the vertices according to following Rules 1 to 3. In a vertex, a 2-ring value refers to the sum of the 1-ring values of vertices directly connected to the vertex.

Rule 1: Calculating 2-ring values of vertices and place a vertex with higher 2-ring value at the front.

Figure 5:
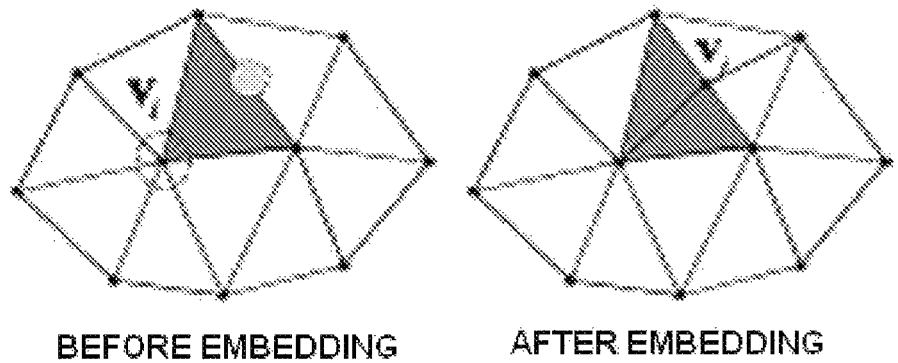
FIG. 5 illustrates vertices that are added in a 3D mesh model in order to set the reference coordinate system of the present invention.

Rule 2: If 2-ring values are also the same, add a vertex to the center point of the edge having the longest length among the adjacent vertices as shown in FIG. 5.

Rule 3: If there are several vertices having the same 1-ring value and 2-ring value, select three vertices that do not belong to the same 1-ring, and repeat Rule 2.

When the third sorting part (304) sorts all vertices, the vertex selection part (306) selects three vertices to be used for setting a reference coordinate system from among the group of the sorted vertices. Here, in case of sorting the vertices in descending order, it is highly likely that front vertices may be significant vertices indicating a 3D mesh model, and thus when selecting vertices, it is preferable to select first three vertices. For the same reason, in case of sorting the vertices in ascending order, it is preferable to select the last three vertices.

In the above embodiment, three vertices for setting a reference coordinate system are selected by sorting the vertices according to 1-ring, but there are other various methods. To be specific, three vertices can be selected by calculating curvatures among polygonal faces of a 3D mesh model and then sorting the vertices in descending order or ascending order. In addition, it is also possible to calculate the areas of polygonal faces of a 3D mesh model, sort the polygonal faces in descending order or ascending order according to the areas, select three polygonal faces among the sorted polygonal faces, and then select their center points as three vertices for setting a reference coordinate system.

Figure 6:
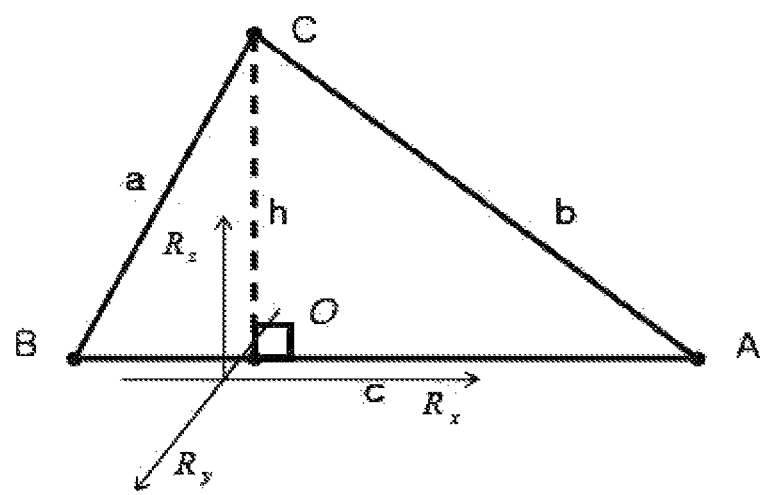
FIG. 6 illustrates 1-ring values and distribution of vertices of 'human' model.

FIG. 6 illustrates an example of a watermark-embedded 3D mesh model according to the present invention. In FIG. 6, (a) shows a 3D mesh model of 'human' model, (b) shows the distribution of vertices, and (c) represents the 1-ring value of each vertex and three selected vertices.

Figure 7:
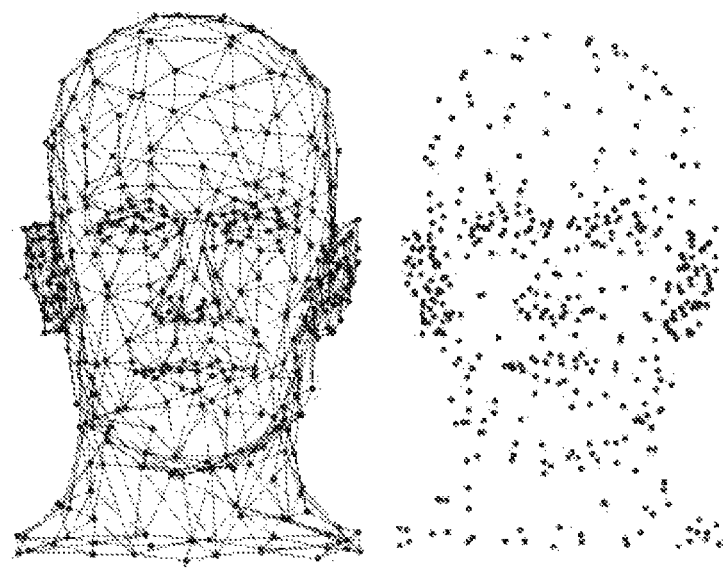
FIG. 7 illustrates the reference coordinate system of the present invention.
Figure 7:
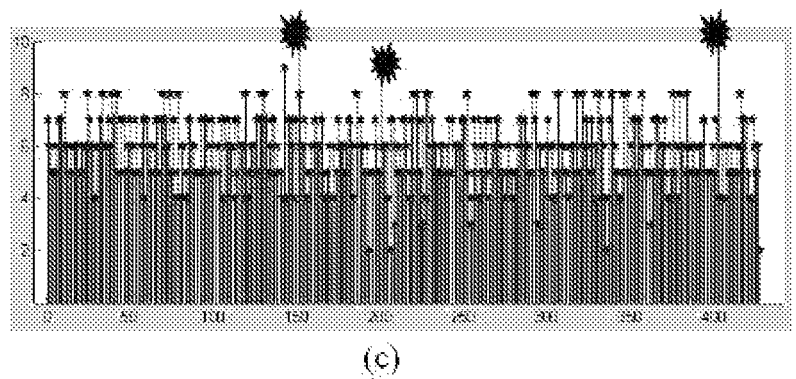

Meanwhile, after three vertices are selected by the vertex selection part (306), the center point and coordinate axis determination part (308) determines a center point and a coordinate axis through steps 1 to 5 below as illustrated in FIG. 7.

Step 1: Let three selected vertices be A, B and C and the opposite edges of the three vertices be a, b and c; calculate the lengths of a, b and c.

Step 2: Select the longest edge c among from a, b and c, and determine a center point where a perpendicular line touches the edge.

Step 3: Calculate the distance from center point O to point {A, B}, determine the direction (OA) of the longer distance as a right direction, and set it as $X(R_x)$ axis.

Step 4: Set vector OC as the right direction with the perpendicular line crossing the center point as $Z(R_z)$ axis.

Step 5: Set the direction of the external vectors of two vectors OA and OC as $Y(R_y)$.

The center point and coordinate axis as set above depend on the graphic invariable (i.e., 1-ring values) of vertices when moving, rotating and downscaling, and they move, rotate and downscale together with a mesh model, and even after conversion, the center point and coordinate axis can be easily found. Accordingly, they satisfy the requirement for setting a reference for embedding a watermark.

The first sorting part (104) sorts all vertices of a 3D mesh model based on the center point of the reference coordinate system set by the reference coordinate system setting part (102) (S204).

Let the vertices of a 3D mesh model be $v_i$, the number of the vertices be M, and a group consisting of these vertices be V, the following equation is formulated.

$$\{v_i | v_i V, 0 < i \leq M\}$$

The first sorting part (104) selects point $v_i$ where $v_i$ V, calculates the distance to the center point of the reference coordinate system, and sorts $v_i$ in ascending order according to the distance. Meanwhile, in this embodiment, the vertices are sorted in ascending order, but it is not necessarily limited to this, and it is also possible to sort the vertices in descending order. Here, a group of sorted vertices is referred to as $V_R$.

Vertices are sorted through the following steps 1 to 3.

Step 1: In order to sort the distances of all the calculated vertices above to the center point, when i≠j, if $|v_i R_c| = |v_j R_c|$, compare $|v_{ix} R_{cx}|$ and $|v_{jx} R_{cx}|$ values and place a vertex with a smaller value first Step 2: if the order is not determined in step 1, i.e., if $|v_{ix} R_{cx}| = |v_{jx} R_{cx}|$, determine the order in the same way as in step 1 by comparing $|v_{iy} R_{cy}|$ and $|v_{jy} R_{cy}|$ values.

Step 3: if the order is not determined in step 2, i.e., if $|v_{iy} R_{cy}| = |v_{jy} R_{cx}|$, compare $|v_{iz} R_{cz}|$ and $|v_{jz} R_{cz}|$ values. Since i≠j, $|v_{iz} R_{cz}| \neq |v_{jz} R_{cz}|$.

Through the steps 1 to 3, group $V_R$ of all vertices of a 3D mesh model having different priority can be determined.

Once the vertices are sorted, the bit-information embedding part (106) initiates parameter N to 1 (S206), and subsequently embeds each bit-information of a watermark based on the sorted vertices, wherein the bit-information consists of bit string (S208).

The order of faces that share the same vertex can be determined according to the sum of orders of a second vertex and a third vertex, or it can be determined by first determining the order with the second vertex and then comparing it with the order of the remaining vertices.

A watermark is data consisting of k-dimensional bit string $A_k = \{a_1, a_2, \ldots, a_k\}$, and an element of bit string $A_k$ is referred to as bit-information of the watermark. An embedded watermark may be data with the purpose of random number sequence or information hiding as needed.

Let a group consisting of information of triangular faces constituting a triangle mesh model be F, each triangle, which is an element of F, be $m_i$ and the number of triangles be e; the following equation is formulated.

$$\{m_i | m_i F, 0 < i \leq e\}$$

Here, $m_i = (n_s, n_r, n_t)$. $(n_s, n_r, n_t)$ represent the indices of three vertices, respectively, and are integers. The index values of the vertices correspond one-to-one to element $v_i$ of group $V_R$.

Bit-information of a watermark is embedded in a manner where the order of the element values of $m_i$ is changed. A triangle comprising vertex $v_i$ that was selected the first is found from group F. Let it be $m_i$, $m_i = (n_s, n_r, n_t)$.

If bit-information of a watermark to be embedded is 1, the vertices are sorted in ascending order by comparing element values of group $m_i$. If in $m_i = (n_s, n_r, n_t)$, $n_r < n_t$, the order of element values are not changed, and if in $m_i = (n_s, n_r, n_t)$, $n_r > n_t$, the order of element values are changed such that $m_i = (n_s, n_t, n_r)$.

Further, if bit-information of a watermark to be embedded is 0, the vertices are sorted in descending order by comparing element values of group $m_i$. If in $m_i = (n_s, n_r, n_t)$, $n_r < n_t$, the order of element values are changed such that $m_i = (n_s, n_t, n_r)$, and if in $m_i = (n_s, n_r, n_t)$, $n_r > n_t$, the order of element values are not changed.

In this embodiment, it is described that if bit-information is 1, the vertices are sorted in ascending order, and that if bit-information is 0, the vertices are sorted in descending order. In reverse, it is also possible to sort the vertices in descending order if bit-information is 1, and sort the vertices in ascending order if bit-information is 0.

Once the embedding of the bit-information is completed according to the rules, the bit-information embedding part (106) compares N with a predetermined number for repetitions C, and if N is equal to or greater than C, the process proceeds to the next step ("YES" at S210). If N is smaller than C, this means that the embedding of bit-information is not performed by the number of repetitions C, it thereby returns to S208 while increasing N by 1 ("NO" at S210). Let bit-information to be re-embedded at S208 be mark(i), k<i≤C·k.

Steps S206 and S210 are included to repeat embedding of bit-information of a watermark in consideration of robustness of the watermark, and this may be properly omitted according to the embodiment.

Once the process of embedding bit-information of a watermark is performed for all triangles in the order of vertices within group $V_R$ sorted based on the center point of the reference coordinate system, the embedding of the watermark is completed. Since the amount of embedding bit-information is associated with the number of triangle meshes of a model, the amount of embedding cannot exceed e. That is, {mark(i), 0<i≤e}.

Then, the second sorting part (108) re-sorts vertices constituting triangular faces in the order where they are stored in the vertex table of a mesh model before inputting of bit-information in the apparatus (100).

Finally, at the output member of the apparatus (100), a watermark-embedded 3D mesh model is output.

Figure 8:
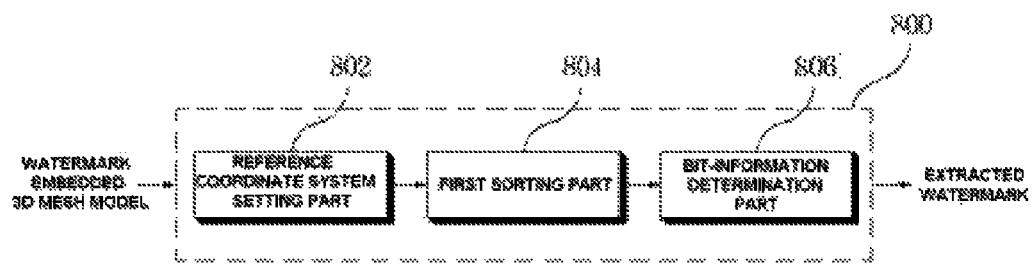
FIG. 8 is a block diagram illustrating the constitution of an apparatus for extracting a watermark according to the present invention.

FIG. 8 is a block diagram illustrating the constitution of an apparatus (800) for extracting a watermark according to the present invention. The apparatus (800) for extracting a watermark comprises a reference coordinate system setting part (802) for setting a reference coordinate system that is the reference for extracting a watermark, a first sorting part (804) for sorting vertices of a 3D mesh mode, and a bit-information reading part (806) for reading bit-information of the watermark.

When a watermark-embedded 3D mesh model is input in the apparatus (800), the reference coordinate system setting part (802) sets a reference coordinate system that is reference for sorting vertices, and the first sorting part (804) sorts the vertices based on the distance from the center point of the set reference coordinate system to each vertex of the 3D mesh model. The bit-information reading part (806) reads bit-information of a watermark that is embedded in each of polygons of the 3D mesh model in the order of the sorted vertices. Finally, a watermark extracted from the output member of the apparatus (800) can be obtained through the read bit-information of the watermark.

Figure 9:
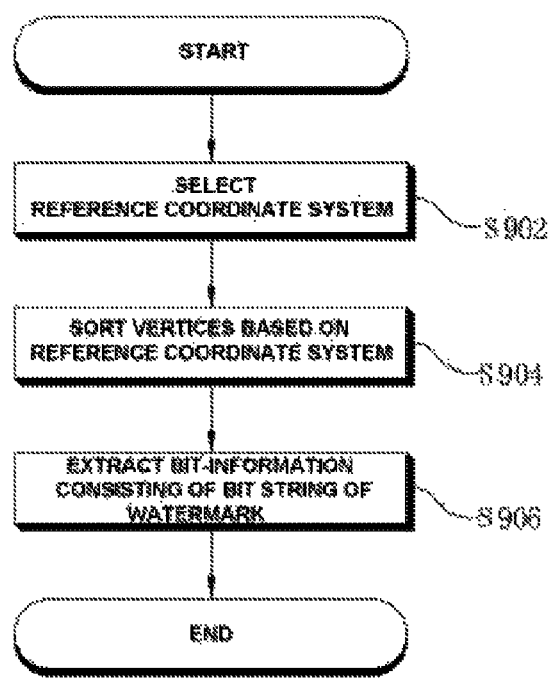
FIG. 9 is a flow chart illustrating a process of extracting a watermark according to the present invention.

FIG. 9 is a flow chart illustrating a method of extracting a watermark using an apparatus (800) for extracting a watermark. The constitution of the apparatus (800) illustrated in FIG. 8 will be described in more detail with reference to FIG. 9.

When data for the watermark-embedded 3D mesh model is input to the apparatus (800), the reference coordinate system setting part (802) sets a reference coordinate system for extracting a watermark (S902).

The reference coordinate system setting part (802) is substantially the same as the reference coordinate system setting part (102) that is comprised in the apparatus (100) for embedding a watermark in terms of constitution and function. To be specific, the reference coordinate system setting part (802) comprises a 1-ring value calculation part (302) for calculating 1-ring values of vertices, a third sorting part (304) for selecting vertices according to the 1-ring values, a vertices selection part (306) for selecting three vertices among the sorted vertices, and a center point and coordinate axis determination part (308) for determining a center point and a coordinate axis of the reference coordinate system using the selected three vertices.

The first sorting part (804) sorts all vertices based on the coordinate value of the center point of the reference coordinate system (S904).

The first sorting part (804) that is included in the apparatus (800) for extracting a watermark is substantially the same as the first sorting part (104) that is included in the apparatus (100) for embedding a watermark. In this regard, the first sorting part (804) should sort the vertices in the same order as the first sorting part (104). In other words, if the first sorting part (104) sorts the vertices in descending order, the first sorting part (804) should sort the vertices in descending order, and if the first sorting part (104) sorts the vertices in ascending order, the first sorting part (804) should sort the vertices in ascending order.

The detailed constitutions of the reference coordinate system setting part (802) and first sorting part (804) are the same as described with regard to the reference coordinate system setting part (302) and first sorting part (304).

Next, a bit-information reading part (806) subsequently reads bit-information embedded in each triangle mesh in the order of the sorted vertices (S906).

For all triangle meshes of group F of vertices, $n_r < n_t$ or $n_r > n_t$ is subsequently determined to read bit-information of a watermark. If in $m_i = (n_s, n_r, n_t)$, $n_r < n_t$, mark (i) is 1, and if in $m_i = (n_s, n_r, n_t)$, $n_r > n_t$, mark (i) is 0. Here, in case where, when embedding a watermark, vertices are sorted in descending order since bit-information is 1, and the vertices are sorted in ascending order since bit-information is 0, the bit-information of the watermark should be read in reverse.

Upon reading bit-information that is embedded in a triangle mesh containing the last vertex based on group $V_R$, the embedded watermark can be constituted.

This embodiment is described with a specific triangle-based 3D mesh model, but the scope of the present invention is not limited to this, and the present invention can be applied to a 3D mesh model based on various polygons such as a quadrangle or pentagon other than a triangle.

However, when converting a file format of a 3D mesh model comprising a polygon other than a triangle, it is first converted into a triangle-based 3D mesh model, and then converted into another file format. This is because in the 3-dimensional scanner system such as a rapid prototyping system, when a 3-dimensional mesh model constituting STL file is used, the file format itself is limited to be based on a triangle. Thus, considering the possibility of file format conversion, it is preferable to use a triangle-based 3D mesh model.

Hereinafter, the results of testing the present invention will be described.

Figure 10:
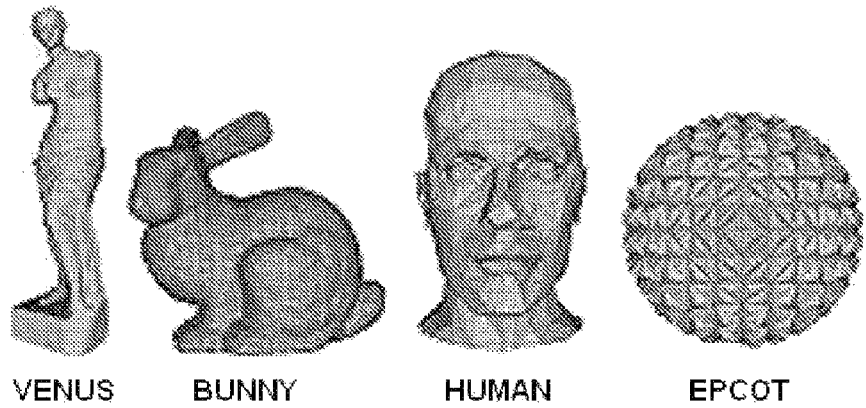
FIG. 10 illustrates test models used for testing in the present invention.

Four models are used for test as illustrated in FIG. 10, and parameters related to respective 3D mesh models are shown in Table 1.

TABLE 1

| | Model | | | |
|---|---|---|---|---|
| | Venus | Bunny | Human | Epcot |
| vertices | 238965 | 8171 | 428 | 770 |
| faces | 476159 | 16338 | 839 | 1536 |
| type | closed model | closed model | opened model | closed model |
| precision | $10^{-6}$ | $10^{-6}$ | $10^{-6}$ | $10^{-6}$ |
| maximum 1-ring values | 15 | 11 | 12 | 13 |

Parameters of test mesh models

Figure 11:
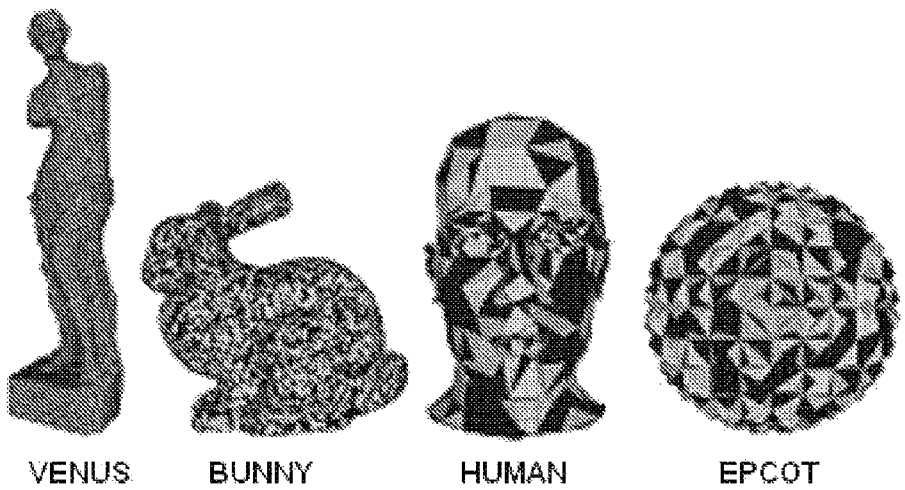
FIG. 11 illustrates watermark-embedded test models according to the present invention.

FIG. 11 illustrates a method according to the present invention, wherein a watermark is embedded, and a portion in which "0" is embedded is represented in white and a portion in which "1" is embedded is represented in black. In order to indicate the change of 3D mesh models before and after embedding of a watermark, the number of coordinates of vertices and the number of faces are shown in Table 2 below.

TABLE 2

| | | Mesh Model | | | |
|---|---|---|---|---|---|
| | | Venus | Bunny | Human | Epcot |
| Original | vertices | 238965 | 8171 | 428 | 770 |
| | faces | 476159 | 16338 | 839 | 1536 |
| After embedding | vertices | 238966 | 8171 | 429 | 773 |
| | faces | 476161 | 16338 | 841 | 1542 |

TABLE 2-continued

|  |  | Mesh Model | | | |
|---|---|---|---|---|---|
|  |  | Venus | Bunny | Human | Epcot |
| The amount of embedding | C = 2 | 238080 | 8169 | 420 | 771 |
|  | C = 3 | 158720 | 5446 | 280 | 515 |

Comparison of parameters before and after embedding a watermark

As shown in the "Epcot" model, in case of a regular geometrical model, in setting a reference coordinate system, an additional operation of vertices for determining the order of 1-ring values is required. And, the amount of embedding bit-information of a watermark when the numbers of repetitions C=2 and C=3 is shown in Table 2.

Figure 12:
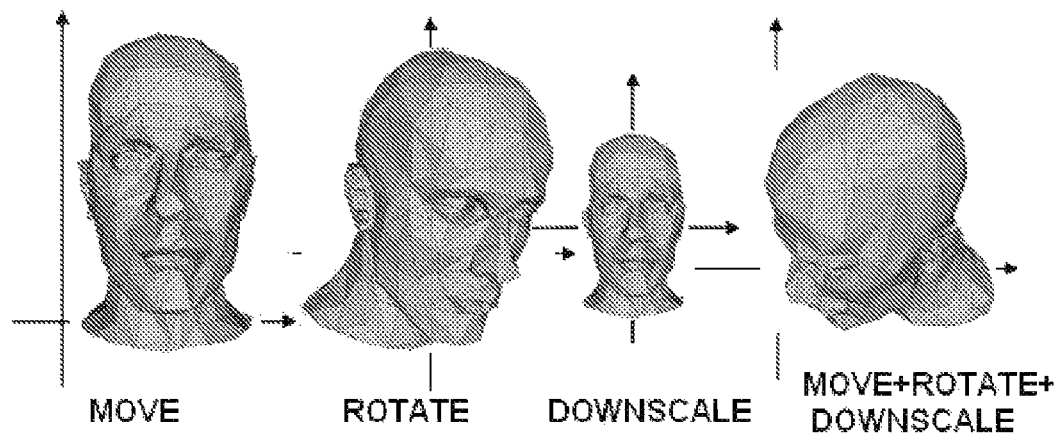
FIG. 12 illustrates results of geometrical conversion for a watermark-embedded 3D mesh model according to the present invention.

FIG. 12 illustrates the results of geometrical conversion executed by movement, rotation, downscaling and combination. The geometrical conversion of a 3D model is executed based on a linear combination of three basic linear operators such as movement, rotation and downscaling. Assuming that the coordinate values of vertices before and after the conversion are P=(x, y, z), P'=(x', y', z'), respectively, basic operators (T is movement, R is rotation, and S is downscaling) of the geometrical conversion are as below.

$$T = \begin{bmatrix} 1 & 0 & 0 & t_x \\ 0 & 1 & 0 & t_y \\ 0 & 0 & 1 & t_z \\ 0 & 0 & 0 & 1 \end{bmatrix}$$

$$R_X(\theta) = \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}$$

$$R_Y(\theta) = \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix}$$

$$R_Z(\theta) = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

$$S = \begin{bmatrix} S_x & 0 & 0 & 0 \\ 0 & S_y & 0 & 0 \\ 0 & 0 & S_z & 0 \\ 0 & 0 & 0 & 1 \end{bmatrix}$$

In Table 3 below, parameters related to watermarking algorithms are shown by classifying them into a variable and an invariable of the geometrical conversion (YES/NO in table 3).

TABLE 3

| | conversion | | | |
|---|---|---|---|---|
| Parameter | Movement | Rotation | Downscaling | Combination |
| Rx/Ry/Rz | NO | NO | NO | NO |
| Face connection | NO | NO | NO | NO |
| 1-ring values | NO | NO | NO | NO |
| Coordinate values | YES | YES | YES | YES |

TABLE 3-continued

| | conversion | | | |
|---|---|---|---|---|
| Parameter | Movement | Rotation | Downscaling | Combination |
| The order of group VR | NO | NO | NO | NO |
| The number of vertices | NO | NO | NO | NO |
| The number of faces | NO | NO | NO | NO |

A variable and an invariable of the geometrical conversion

For model "Bunny", during the process of embedding a watermark, vertices are not added, for models 'Venus,' 'Human,' and 'Epcot', one vertex, one vertex and three vertices are added, respectively. This shows that the conversion by movement, rotation and downscaling changes only the coordinate values of the added vertices, but does not affect the 1-ring values of the vertices.

All of the test models do not change in the connection state of faces that are connection information of each vertex, and the embedded watermark can be extracted. To be specific, watermarking according to the present invention is robust against the geometrical conversion.

In addition, attacks by other conversions than movement, rotation and downscaling while preserving the shape will be described.

The method of setting a reference coordinate system according to the present invention is independent from changing the order of storing vertices, because the order of vertices is sorted using 1-ring values and then a watermark is extracted, even though the order of storing vertices is changed. Accordingly, the method is robust against an attack of changing the order of storing the vertices. Similarly, the method is robust against an attack of changing the order of storing facets used in STL file.

STL and PLY files exist in two standard formats, i.e., ASCII and Binary formats, and in the present invention, the two files were tested by converting binary format into ASCII format. DAE file was tested in the version of COLLADA 1.4.1, and OBJ and OFF files were tested after converting them into Meshlab 1.0 program which was distributed on March, 2007. STL file has a selective matter on whether to use a copy depending on the program in importing. In case of not using a copy, the original model is loaded, and in case of using a copy, overlapping vertices are generated within the file. The overlapping point was not considered when elements were sorted, and regardless of whether a copy is used, a watermark could be extracted from all models that were used for test.

Types of file formats and their descriptions are shown in Table 4.

TABLE 4

| Format | Type | Description |
|---|---|---|
| STL | ASCII Binary | Stereo lithography |
| PLY | ASCII Binary | Standard polygonal file format |
| DAE | ASCII | COLLODA file format (V 1.4.1) |
| OBJ | ASCII | Alias wavefront Object |
| OFF | ASCII | Object file format |

Description related to file formats

In addition, Table 5 below shows the comparison of the present invention with prior arts (comparative examples 1~3) in terms of robustness.

TABLE 5

| Algorithm/ attack types | Movement | Downscaling | Rotation | The order of storing faces | The order of storing vertices | File conversion | Precision | RP applicable |
|---|---|---|---|---|---|---|---|---|
| Comparative example 1 | X | X | X | ○ | ○ | X | Invariable | Possible |
| Comparative Example 2 | X | X | X | ○ | ○ | X | Invariable | Possible |
| Comparative example 3 | ○ | ○ | ○ | ○ | ○ | ○ | Damage | Impossible |
| Working example | ○ | ○ | ○ | ○ | ○ | ○ | Invariable | Possible |

The algorithms in comparative examples 1 and 2 are algorithms specific to STL file, and they are described in Korean Patent Laid-Open No. 2004-002250 and described in Korean Patent Laid-Open No. 2004-0003185. When a file is converted, watermark information disappears, but watermarking according to the present invention is robust against geometrical conversion such as movement, rotation and downscaling as well as file conversion. Comparative example 3 is an algorithm proposed by Chang as described above, and is robust against movement, rotation, downscaling, changing of the order of storing facets, changing of the order of storing vertices, and file conversion, and robustness is maintained against the attack by changing partial format. However, since Chang embedded a watermark by changing the positions of vertices, this does not satisfy the required precision, and thus the algorithm proposed by Chang cannot be used in the rapid prototyping system. In addition, although it is not shown in Table 5, Obuchi's algorithm cannot be used in the rapid prototyping system because the shape of a 3D mesh model is deformed by embedding a watermark.

Figure 13:
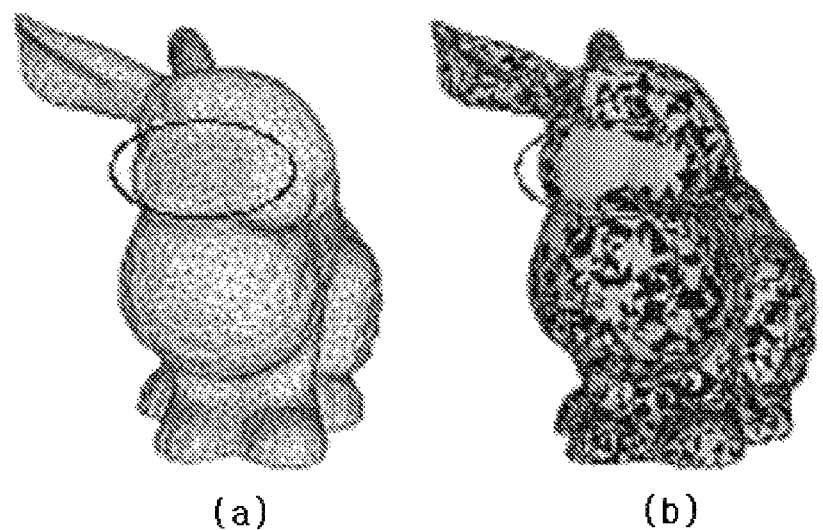
FIG. 13 illustrates executing smoothing on 'Bunny' model according to the present invention and then comparing a watermark-embedded image and an image after extracting the watermark.

FIG. 13 illustrates a process of selecting a partial vertex of model "Bunny", executing smoothing, and comparing a watermark-embedded image with an image from which the watermark was extracted. In FIG. 13, (a) shows a watermark-embedded image and (b) shows an image from which the watermark was extracted. According to watermarking of the present invention, when receiving attack of deforming the shape of a 3D mesh model, a watermark may be modified, and thus as shown in FIG. 13, in the "forged and deformed" portion, the embedded bit-information of embedded watermark is not consistent with the extracted bit information. Thus, the portion receiving the attack can be found by using the embedded bit-information of the watermark, and it can be detected whether it is forged or deformed.

The method of embedding and extracting a watermark according to the present invention is not limited to the geometrical and topological shape, and can be applied to opened models, closed models, and various genus models.

Various exemplified logical blocks and algorithm steps described here in relation to the embodiments above can be implemented as electric hardware, computer software, or their combination.

In addition, the embodiments of the present invention described above are only for examples, but the present invention is not limited to these embodiments. Various other changes and modifications can be made without departing from the spirit and scope of the invention. The present invention is not limited by the description described above, but only limited by the scope of the claims attached herewith.

Industrial Applicable

According to the present invention, it is possible to satisfy the need of precision of a rapid prototyping system. To be specific, according to conventional watermarking methods, the precision of the rapid prototyping system decreases, and thus they are limited in application, whereas the present invention does not deform the shape of a model before and after embedding information. In addition, the present invention is robust against conversion while preserving the shape such as movement, rotation, downscaling, conversion of file format, and changing of the order of storing vertices, and is weak in typical attacks by deforming the shape. Thus, the present invention can be used for authenticating data integrity, and this can be variously applicable in mechanical, automobile, aerospace and shipbuilding fields that require to manufacture a trial product with high precision. In the game and animation fields, integrity of data can be authenticated by using the present invention twice. Other than the above, since lots of information can be embedded, the present invention can be used for information hiding.

The invention claimed is:

1. A method for embedding a watermark for a 3-dimensional (3D) mesh model, comprising:
    setting reference coordinate system using 1-ring values of all vertices of the 3D mesh model, wherein the 1-ring values correspond to the number of vertices directly connected to one vertex of the 3D mesh model;
    a first sorting for sorting the vertices in a predetermined order based on a size of a distance from a center point of the reference coordinate system;
    embedding bit-information of the watermark by changing the order of index values of the vertices of polygonal face of the 3D mesh model according to the order of the vertices sorted at the first sorting, wherein the bit-information consists of bit string; and
    a second sorting for re-sorting the vertices sorted at the first sorting in the original order,
    wherein the 3D mesh model is triangle-based mesh model, and the polygonal face is a triangular face.

2. The method of claim 1, wherein the setting reference coordinate system comprises:
    calculating the 1-ring values of the vertices of the 3D mesh model;
    a third sorting for sorting the vertices in a predetermined order according to the 1-ring values;
    selecting three vertices among the sorted vertices;
    selecting as a first edge, the longest edge among the opposite edges of the selected three vertices; and
    determining the center point where a perpendicular line from the vertex opposite to the first edge crosses the first edge.

3. The method of claim 2, wherein the third sorting comprises sorting the vertices in ascending order or in descending order, and wherein the selecting three vertices comprises selecting the first three vertices if the vertices are sorted in descending order and selecting the last three vertices if the vertices are sorted in ascending order.

4. The method of claim 1, wherein the setting reference coordinate system comprises:
calculating curvatures between the polygonal faces of the 3D mesh model;
sorting the vertices in ascending order or in descending order according to the curvatures;
selecting three vertices among the sorted vertices;
selecting as a first edge, the longest edge among the opposite edges of the selected three vertices; and
determining a center point where a perpendicular line from the vertex opposite to the first edge crosses the first edge.

5. The method of claim 1, wherein the setting reference coordinate system comprises:
calculating the sizes of polygonal faces of 3D mesh model;
sorting the vertices in ascending order or in descending order according to the sizes;
selecting three vertices among the sorted vertices;
selecting as a first edge, the longest edge among the opposite edges of the selected three vertices; and
determining a center point where a perpendicular line from the vertex opposite to the first edge crosses the first edge.

6. The method of claim 1, wherein the first sorting comprises:
sorting the vertices in ascending order or in descending order according to the size of the distance from the center point of the reference coordinate system to each vertex.

7. The method of claim 1, wherein the embedding bit-information comprises:
embedding the bit-information of the watermark repeatedly for the preset number of repetition.

8. The method of claim 1, wherein the embedding bit-information comprises:
sorting the vertices in ascending order if the bit-information to be embedded is 1; and
sorting the vertices in descending order if the bit-information to be embedded is 0.

9. An apparatus for embedding a watermark for a 3-dimensional (3D) mesh model, comprising:
means for setting reference coordinate system using 1-ring values of all vertices of the 3D mesh model, wherein the 1-ring values correspond to the number of vertices directly connected to one vertex of the 3D mesh model;
a first sorting means for sorting the vertices in a predetermined order based on a size of a distance from a center point of the reference coordinate system;
means for embedding bit-information of the watermark by changing order of index values of the vertices of polygonal face of the 3D mesh model in the order of vertices sorted at the first sorting, wherein the bit-information consists of bit string; and
a second sorting means for re-sorting the vertices sorted at the first sorting in the original order,
wherein the 3D mesh model is triangle-based mesh model, and the polygonal face is a triangular face.

10. The apparatus of claim 9, wherein the means for setting reference coordinate system comprises:
means for calculating the 1-ring values of the vertices of the 3D mesh model;
a third sorting means for sorting the vertices in a predetermined order according to the 1-ring values;
means for selecting three vertices among the sorted vertices;
means for selecting as a first edge, the longest edge among the opposite edges of the selected three vertices; and
means for determining the center point where a perpendicular line from the vertex opposite to the first edge crosses the first edge.

11. The apparatus of claim 10, wherein the third sorting means comprises means for sorting the vertices in ascending order or in descending order, and
wherein the selecting three vertices comprises means for selecting the first three vertices if the vertices are sorted in descending order and means for selecting the last three vertices if the vertices are sorted in ascending order.

12. The apparatus of claim 9, wherein the first sorting means comprises:
means for sorting the vertices in ascending order or in descending order according to the size of the distance from the center point of the reference coordinate system to each vertex.

13. The apparatus of claim 9, wherein the means for embedding bit-information comprises:
means for embedding the bit-information of the watermark repeatedly for the preset number of repetition.

14. The apparatus of claim 9, wherein the means for embedding bit-information comprises:
means for sorting the vertices in ascending order if the bit-information to be embedded is 1; and
means for sorting the vertices in descending order if the bit-information to be embedded is 0.

15. A method for extracting a watermark from the 3-dimensional (3D) mesh model, comprising:
setting reference coordinate system using 1-ring values of all vertices of the 3D mesh model, wherein the 1-ring values correspond to the number of vertices directly connected to one vertex of the 3D mesh model;
a first sorting for sorting the vertices in a predetermined order based on a size of a distance from a center point of the reference coordinate system; and
determining bit-information of the watermark based on the order of index values of the vertices of polygonal face of the 3D mesh model in the order of vertices sorted at the first sorting, wherein the bit-information consists of bit string,
wherein the 3D mesh model is triangle-based mesh model, and the polygonal face is a triangular face.

16. The method of claim 15, wherein the setting reference coordinate system comprises:
a third sorting for sorting the vertices in a predetermined order according to the 1-ring values;
selecting three vertices among the sorted vertices;
selecting as a first edge, the longest edge among the opposite edges of the selected three vertices; and
determining the center point where a perpendicular line from the vertex opposite to the first edge crosses the first edge.

17. The method of claim 16, wherein the third sorting comprises sorting the vertices in ascending order or in descending order, and
wherein the selecting three vertices comprises selecting the first three vertices if the vertices are sorted in descending order and selecting the last three vertices if the vertices are sorted in ascending order.

18. The method of claim 15, wherein the first sorting comprises:
sorting the vertices in ascending order or in descending order according to the size of the distance from the center point of the reference coordinate system to each vertex.

19. The method of claim 15, wherein the determining bit-information comprises:
determining the bit-information to be 1 if the vertices are sorted in ascending order; and
determining the bit-information to be 0 if the vertices are sorted in descending order if the vertices are sorted in descending order.

20. An apparatus for extracting a watermark from the 3-dimensional (3D) mesh model, comprising:
means for setting reference coordinate system using 1-ring values of all vertices of the 3D mesh model, wherein the 1-ring values correspond to the number of vertices directly connected to one vertex of the 3D mesh model;
a first sorting means for sorting the vertices in a predetermined order based on a size of a distance from a center point of the reference coordinate system; and
means for determining bit-information of the watermark based on the order of index values of the vertices of polygonal face of the 3D mesh model in the order of vertices sorted at the first sorting, wherein the bit-information consists of bit string,
wherein the 3D mesh model is triangle-based mesh model, and the polygonal face is a triangular face.

21. The apparatus of claim 20, wherein the means for setting reference coordinate system comprises:
a third sorting means for sorting the vertices in a predetermined order according to the 1-ring values;
means for selecting three vertices among the sorted vertices;
means for selecting as a first edge, the longest edge among the opposite edges of the selected three vertices; and
means for determining the center point where a perpendicular line from the vertex opposite to the first edge crosses the first edge.

22. The apparatus of claim 21, wherein the third sorting means comprises means for sorting the vertices in ascending order or in descending order, and
wherein the means for selecting three vertices comprises means for selecting the first three vertices if the vertices are sorted in descending order and means for selecting the last three vertices if the vertices are sorted in ascending order.

23. The apparatus of claim 20, wherein the first sorting means comprises:
means for sorting the vertices in ascending order or in descending order according to the size of the distance from the center point of the reference coordinate system to each vertex.

24. The apparatus of claim 20, wherein the means for determining bit-information comprises:
means for determining the bit-information to be 1 if the vertices are sorted in ascending order; and
means for determining the bit-information to be 0 if the vertices are sorted in descending order if the vertices are sorted in descending order.

\* \* \* \* \*

UNITED STATES PATENT AND TRADEMARK OFFICE
CERTIFICATE OF CORRECTION

PATENT NO. : 8,610,709 B2  Page 1 of 1
APPLICATION NO. : 12/919476
DATED : December 17, 2013
INVENTOR(S) : Choi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this
Twenty-second Day of September, 2015

Michelle K. Lee
*Director of the United States Patent and Trademark Office*